(12) United States Patent
Lake et al.

(10) Patent No.: US 9,243,724 B1
(45) Date of Patent: Jan. 26, 2016

(54) HOSE SUPPORT

(71) Applicant: Western Oilfields Supply Company, Bakersfield, CA (US)

(72) Inventors: John W. Lake, Bakersfield, CA (US); Bradley C. Streeper, Ucon, ID (US)

(73) Assignee: Western Oilfields Supply Company, Bakersfield, CA (US)

( * ) Notice: Subject to any disclaimer, the term of this patent is extended or adjusted under 35 U.S.C. 154(b) by 0 days.

(21) Appl. No.: 14/664,238

(22) Filed: Mar. 20, 2015

(51) Int. Cl.
*A47G 29/00* (2006.01)
*F16L 3/26* (2006.01)
*F16L 3/10* (2006.01)

(52) U.S. Cl.
CPC *F16L 3/26* (2013.01); *F16L 3/1058* (2013.01)

(58) Field of Classification Search
CPC ............... F16L 3/26; F16L 3/28; F16L 3/00; F16L 3/1058; B05B 15/063; B65H 75/4478; B65H 2701/33
USPC ............. 248/80, 65, 49, 176.1, 188.1, 309.1, 248/346.01; 174/68.1; 285/61; 138/106
See application file for complete search history.

(56) References Cited

U.S. PATENT DOCUMENTS

| | | | | |
|---|---|---|---|---|
| 4,228,990 A | * | 10/1980 | Horvath | E03F 9/00 15/104.33 |
| 6,012,684 A | * | 1/2000 | Umney et al. | F01D 25/00 248/65 |
| 6,648,281 B1 | * | 11/2003 | Lake | F16L 3/02 248/49 |
| 7,926,768 B2 | * | 4/2011 | Prest | F16L 3/26 138/106 |
| 2014/0197283 A1 | * | 7/2014 | Lake | F16L 3/222 248/49 |

* cited by examiner

*Primary Examiner* — Todd M Epps
(74) *Attorney, Agent, or Firm* — Holland & Knight LLP; Richard E. Lyon, Jr.

(57) ABSTRACT

A support for a suction or ventilation hose extending upwardly through an open manhole and in a horizontal disposition from the manhole to a water pump intake or air pump including a lower horizontal support surface, a pair of laterally spaced side walls extending upwardly from the lower horizontal support surface and a generally U-shaped hose support surface extending along a curvilinear path between the side walls from a lower rear portion of the support to an elevated forward portion thereof. A depending stop is disposed rearwardly adjacent to the lower support surface. The stop defines a curvilinear abutment surface adapted to extend into an open manhole and abut a perimeter portion thereof upon the lower support surface being positioned adjacent to the manhole. A strap securement is provided for securing a portion of a hose against the hose support surface on said hose support.

10 Claims, 4 Drawing Sheets

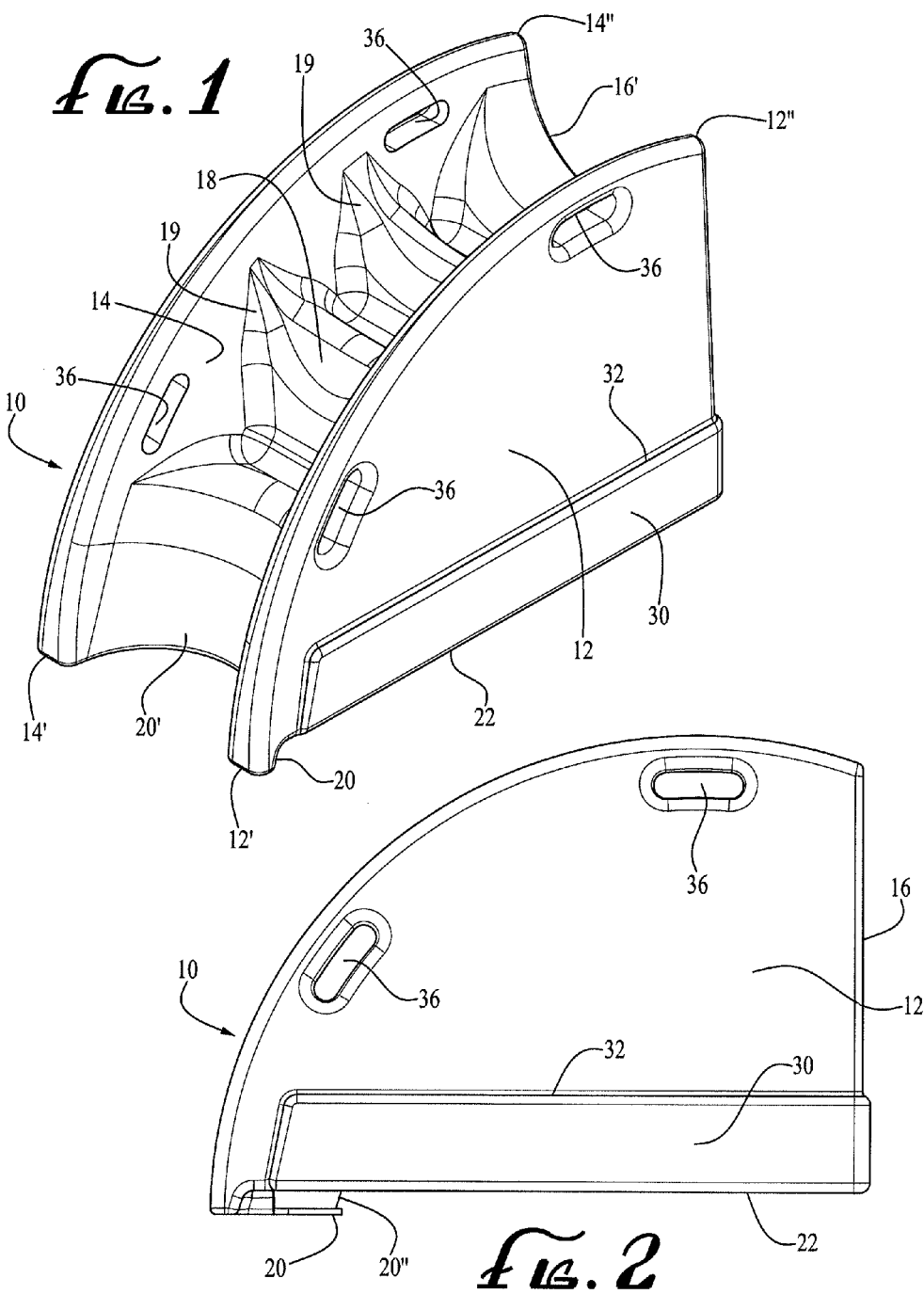

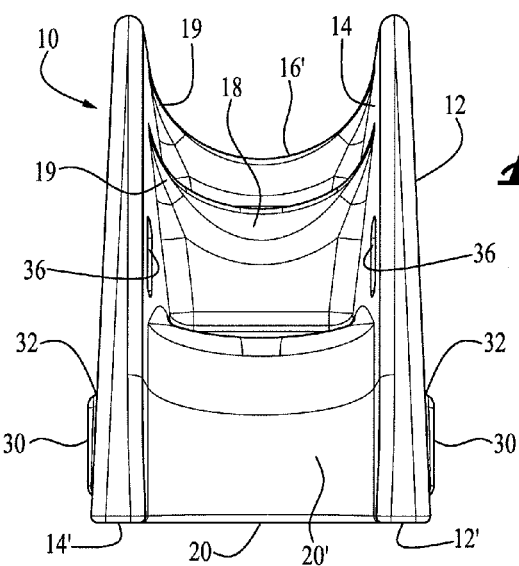
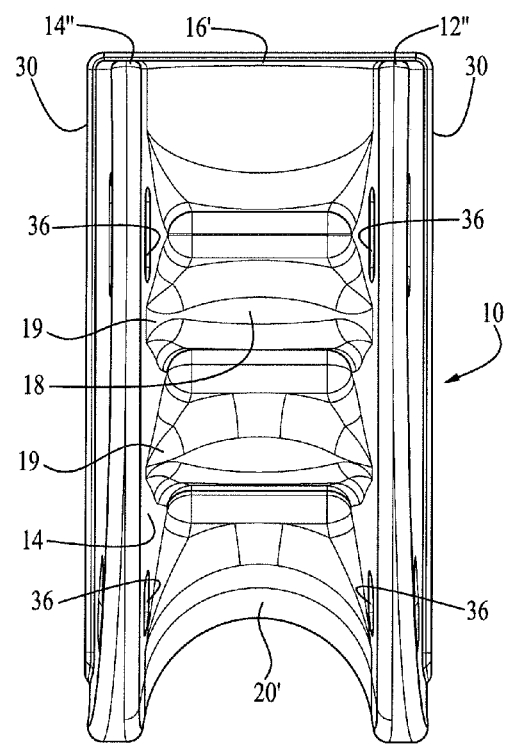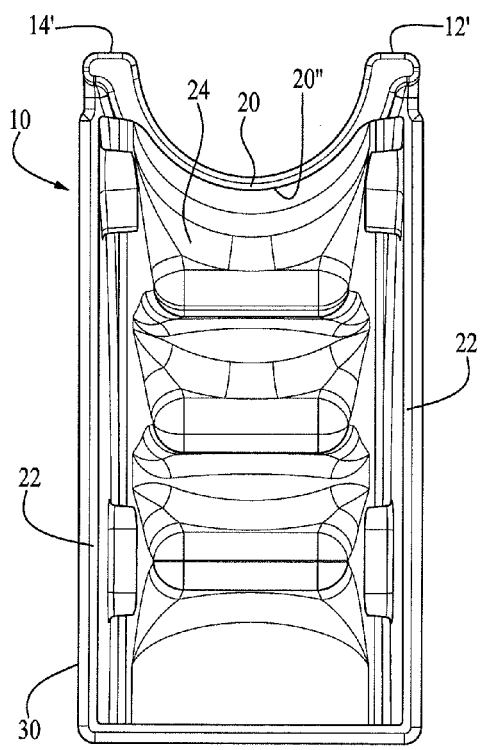

HOSE SUPPORT

BACKGROUND OF THE INVENTION

The present invention is directed to a support for a suction hose extending through an open manhole and communicating a sewer or storm drain with a water pump or a flexible air conducting ventilation hose with an air pump. A common problem associated with suction hoses and ventilation hoses in such applications is the tendency of the hose to crimp where it exits the manhole which can damage the hose, reducing the hose's ability to withstand negative pressures, leading to collapse and failure. The present invention is self-supporting adjacent to the open manhole and provides a U-shaped curvilinear support surface for the hose as it transitions between a vertical orientation within the manhole to an elevated horizontal disposition exteriorly of the manhole. While straps are preferably used with the hose support to anchor the hose to the support during use, the U-shaped support track vertically and laterally supports the hose as it extends thereover and negotiates a ninety degree turn upon exiting the manhole. By virtue of this support, kinking in the hose is prevented, facilitating the use of the hose in a safe manner and extending its useful life.

SUMMARY OF THE INVENTION

The hose support of the present invention includes a lower horizontal support surface adapted to rest on a roadway or other surface adjacent to an open manhole, a pair of laterally spaced side walls extending upwardly from the lower support surface and a generally U-shaped or concave hose support surface extending along a curvilinear path from a lower rear end portion of the hose support to an upper forward end portion thereof. A depending arcuate stop is provided adjacent to the rearward end of the lower support surface that is adapted to extend into the open manhole adjacent to the manhole wall when the lower support surface of the hose support is positioned on the ground or other horizontal surface adjacent to the manhole. When the hose is pulled forwardly over the hose support, the depending stop abuts the side wall of the manhole, preventing forward movement of the hose support with respect to the manhole.

The arcuate stop defines a curvilinear abutment surface that bears against the curvilinear side wall of the manhole, allowing for some rotational movement of the hose support with respect to the manhole while maintaining the surface to surface contact therebetween and avoiding point loading on the hose support. With the suction hose resting thereon, the hose support provides a curvilinear support track for the hose from its vertical orientation exiting the manhole to a forward horizontal disposition for communication with a water pump while the side walls defined by the generally U-shaped or concave support surface inhibit lateral movement of the hose on and with respect to the support.

In a preferred configuration of the present invention, strap attachment means are provided on the hose support to enhance the securement of the portion of the suction hose resting on the hose support to the hose support surface. Transversely extending ribs also are provided between the side walls to provide enhanced structural rigidity for the hose support without adversely affecting the ability of the hose to move thereover and the lower end of the hose support is open interiorly of the lower support surface and the laterally spaced side walls are configured so as to fit within the lower open end of another hose support to accommodate nested stacking thereof for storage and transporting.

BRIEF DESCRIPTION OF THE DRAWINGS

FIG. 1 is a perspective view of the hose support of the present invention.

FIG. 2 is a side view of the hose support of the present invention.

FIG. 3 is a front elevational view of the hose support of the present invention.

FIG. 4 is a top plan view thereof.

FIG. 5 is a bottom plan view thereof.

DETAILED DESCRIPTION OF THE PREFERRED EMBODIMENTS

Figure 6:
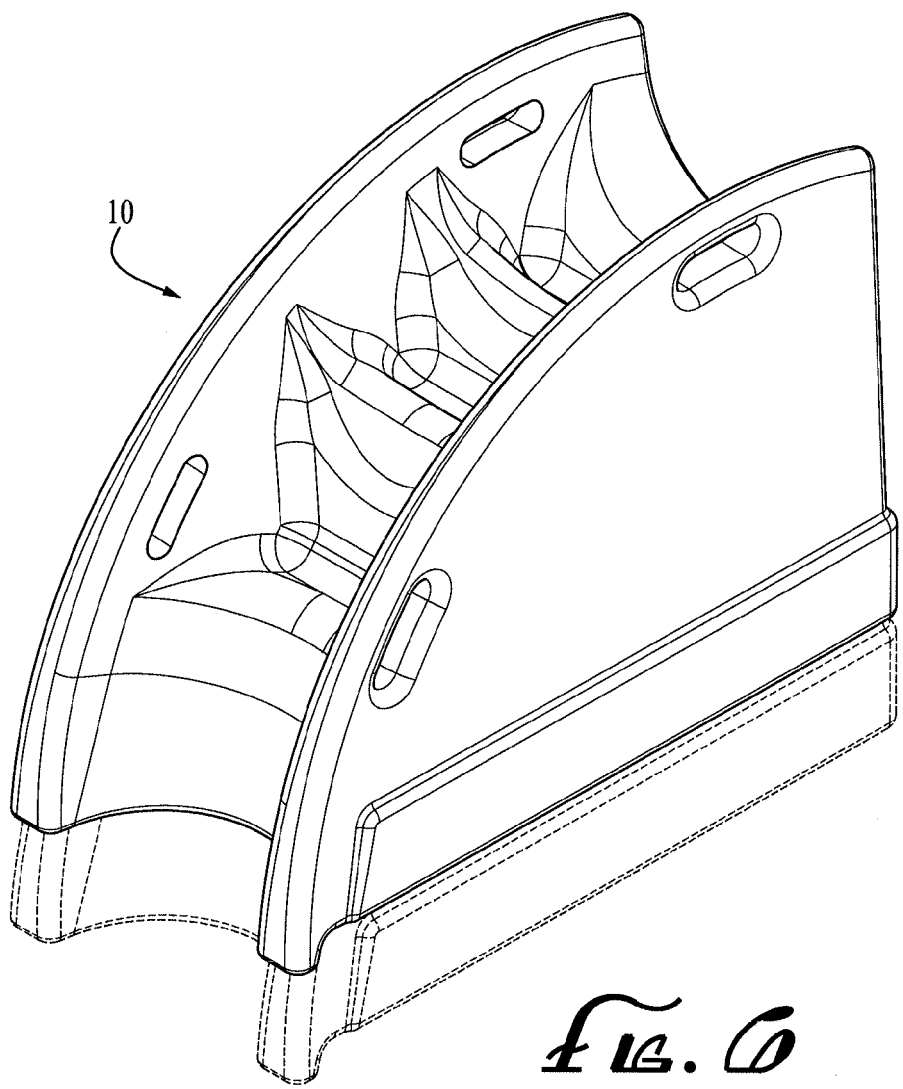
FIG. 6 is a perspective view illustrating the stacking of a pair of hose supports of the present invention.

The hose support 10 of the present invention preferably is rotationally molded of a high density polyethylene material so as to be durable, relatively light in weight so that it can be readily handled by a single person and economical to manufacture. Other suitable materials and manufacturing techniques also could be employed. The hose support 10 comprises a pair of laterally spaced upstanding side walls 12 and 14, a forward wall 16 and a generally U-shaped or concave hose support surface 18. The hose support surface 18 extends upwardly and forwardly along a curvilinear path between the side walls 12 and 14 from the lower rear end portions 12' and 14' of the side walls to the upper forward end portions 12" and 14" thereof and terminates in an upper end portion 16' of the forward hose support wall 16. A plurality of structural support ribs 19 extend transversely across the hose support surface 18 to add rigidity to the hose support 10. The ribs 19 preferably are curvilinear in cross-section so as not to obstruct or otherwise interfere with the movement of a suction hose thereover and are configured to provide the draft angles necessary for rotational molding of the hose support and the removal of the hose support from the mold.

Figure 7:
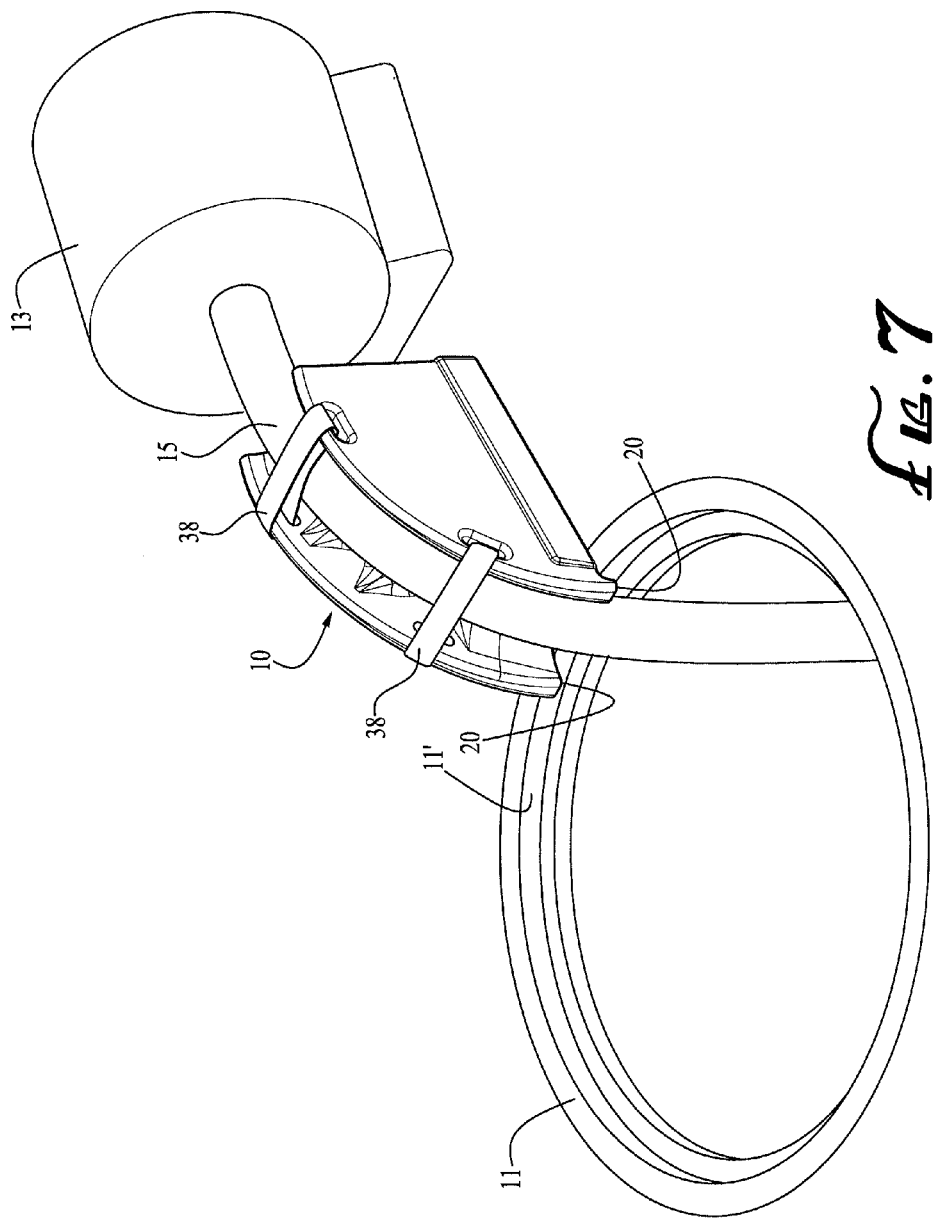
FIG. 7 is a perspective view of a suction hose and or a ventilation hose exiting a manhole and extending over a hose support of the present invention to a water pump.

The terms forward and rearward are used herein with reference to the manhole 11 adjacent to which the hose support 10 is to be positioned and with respect to a pump 13 to which a suction hose 15 extending out of the manhole 11 and over the support 10 extends, as illustrated in FIG. 7. The end of the hose support 10 facing the pump 13 is referred to herein as the front or forward end and the end of the hose support adjacent to the manhole 11 is referred to as the rear or rearward end of the hose support.

The rearward end of the hose support 10 defines an arcuate depending stop 20 adjacent to the bottom horizontal support surface 22 of the hose support 10 such that upon positioning the hose support over and adjacent to a side of an open manhole 11, the stop 20 projects into the manhole adjacent to a portion of the perimeter wall 11' thereof while the bottom support surface 22 of the hose support rests on the roadway or other surface through which the manhole 11 extends. In a preferred configuration, the stop 20 extends along an arcuate path with the rearward facing surface 20' being contiguous with and forming the rearward end portion of the hose support surface 18. The forward facing surface 20" of stop 20 defines curvilinear convex abutment surface 24 for engaging the side or perimeter wall 11' of the manhole. In place adjacent to the manhole with the curvilinear abutment surface 20" abutting the curvilinear side of the manhole 11, the suction hose is prevented from dislodging the hose support 10 from the manhole when the hose is pulled forwardly along the hose support surface 18. Because of its curvilinear configuration, the depending stop 20 allows the hose support to undergo limited rotational movement with respect to the open manhole while maintaining surface to surface contact with the manhole without any point loading as noted above.

To facilitate storage and transporting, the hose support 10 is preferably configured such that a plurality of hose supports 10 can be nested together in a vertical stack. The area 24 interiorly of the lower support surface 22 between side walls 12 and 14 is open and the side walls 12 and 14 of the hose supports can be tapered inwardly from the lower ends thereof to their upper ends to allow for such nesting. A surrounding ridge 30 can be provided about the lower portion of the side and forward walls to define a horizontal abutment surface 32 extending about the hose support proximate the lower end thereof to limit the depth of the nesting and thereby facilitate the separation of nested hose supports.

One or more pairs transversely aligned apertures 36, preferably rectangular or generally rectangular, (two such pairs being shown) can be provided in the side walls 12 and 14 proximate the upper ends thereof to accommodate one or more flexible hose securement straps 38 for removeably anchoring a portion of the suction hose 15 carried by the hose support 10 to the hose support and thereby enhance the support provided by the open walled hose support surface 18. In a preferred configuration, two such aligned pairs of apertures are provided, one proximate the lower rear end portion of the hole support and the other proximate the elevated forward end thereof. Apertures 36 also provide a convenient means for carrying and handling the hose support 10 when not in use.

In use, the upper support surface 18 provides a continuous support surface or track to transition the hose resting thereon from a substantially vertical orientation as it exits the manhole to an elevated forward horizontal orientation for attachment to the suction inlet end of the water pump. The cooperation of the vertical support provided by surface 18 with the lateral restraint provided by the upstanding wall portions of the U-shaped or concave support surface 18 and the securement straps 38 not only hold the suction hose in place on the support 10 so that the hose does not present a safety hazard but also prevents the hose from kinking where it exits the manhole, preventing damage to the hose as earlier described. In addition to being used as above described, the hose support of the present invention also could be used in mines to support the ventilation hose adjacent to vertical drops between drifts in the mine to keep the hose from collapsing or crimping.

By way of example only, an embodiment of hose support 10 configured to support suction and ventilation hoses up to twelve inches in nominal diameter can be about forty one inches in length, twenty inches wide and thirty and one half inches high. The curvilinear hose support surface 18 defines a radius of about 6.75 inches and the hose support weighs approximately fifty pounds.

Various changes and modifications including, but not limited to, the accommodation of various hose diameters can be made in carrying out the present invention without departing from the spirit and scope thereof. Insofar as these changes and modifications are within the purview of the appended claims, they are to be considered as part of the present invention.

What is claimed is:

1. A support for suction and ventilation hoses extending upwardly through an open manhole and in a generally horizontal disposition from the manhole to a water pump intake or an air pump, said hose support comprising:
   a lower horizontal support surface;
   a pair of laterally spaced side walls extending upwardly from said lower horizontal support surface;
   a U-shaped hose support surface extending along a curvilinear path between said side walls from a lower rear portion of the hose support to an elevated forward portion thereof; and
   a depending stop rearwardly adjacent to said lower support surface, said stop defining a curvilinear abutment surface adapted to extend into an open manhole and abut a perimeter portion thereof upon said lower horizontal support surface being positioned adjacent to the manhole.

2. The hose support of claim 1 including at least one strap engagement member for securing a portion of a hose on said hose support surface on said hose support.

3. The hose support of claim 1 including a plurality of pairs of transversely aligned openings extending through upper portions of said side walls, one of said pairs being disposed proximate said lower rear end portion of said hose support, another of said pairs being disposed proximate said elevated forward portion and a plurality of flexible straps cooperating with said openings for securing a portion of a suction or ventilation hose against said U-shaped hose support surface.

4. The hose support of claim 1 wherein said curvilinear abutment surface defined by said stop is convex so as to allow rotational movement of said hose support with respect to said manhole while maintaining abutting engagement of said abutment surface against a perimeter portion of the manhole and avoiding point loading therebetween.

5. The hose support of claim 1 wherein said lower support surface extends about an open area interiorly of said side walls and wherein said side walls are inwardly inclined whereby a plurality of said hose supports can be nested together in a stacked configuration.

6. The hose support of claim 1 including a plurality of structural ribs extending transversely across said U-shaped hose support surface between said side walls, said supporting ribs being curvilinear in cross-section.

7. The hose support of claim 5 including a horizontal abutment surface extending about a lower portion of said hose support and outwardly from said side walls, said abutment surface limiting the extent of the nesting of said hose support in a stacked configuration thereby facilitating the removal of a hose support from a nested stacked configuration.

8. The hose support of claim 2 wherein said curvilinear abutment surface defined by said stop is convex so as to allow rotational movement of said hose support with respect to said manhole while maintaining abutting engagement of said abutment surface against a perimeter portion of the manhole and avoiding point loading therebetween.

9. The hose support of claim 3 wherein said curvilinear abutment surface defined by said stop is convex so as to allow rotational movement of said hose support with respect to said manhole while maintaining abutting engagement of said abutment surface against a perimeter portion of the manhole and avoiding point loading therebetween.

10. The hose support of claim 5 including at least one strap engagement member for securing a portion of a hose on said hose support surface on said hose support.

* * * * *